Figure 1:
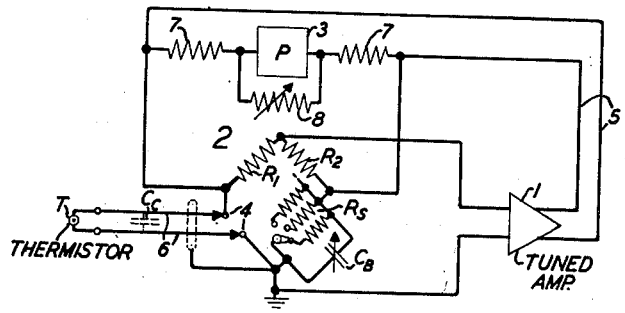

March 30, 1954

A. H. DOBLMAIER 2,673,960

THERMISTOR MEASURING APPARATUS

Filed March 22, 1950

3 Sheets-Sheet 1

INVENTOR
A. H. DOBLMAIER
BY
Walter M. Hill
ATTORNEY

March 30, 1954

A. H. DOBLMAIER 2,673,960

THERMISTOR MEASURING APPARATUS

Filed March 22, 1950

3 Sheets-Sheet 2

INVENTOR
A. H. DOBLMAIER
BY
Walter M. Hill
ATTORNEY

March 30, 1954 A. H. DOBLMAIER 2,673,960
THERMISTOR MEASURING APPARATUS
Filed March 22, 1950 3 Sheets-Sheet 3
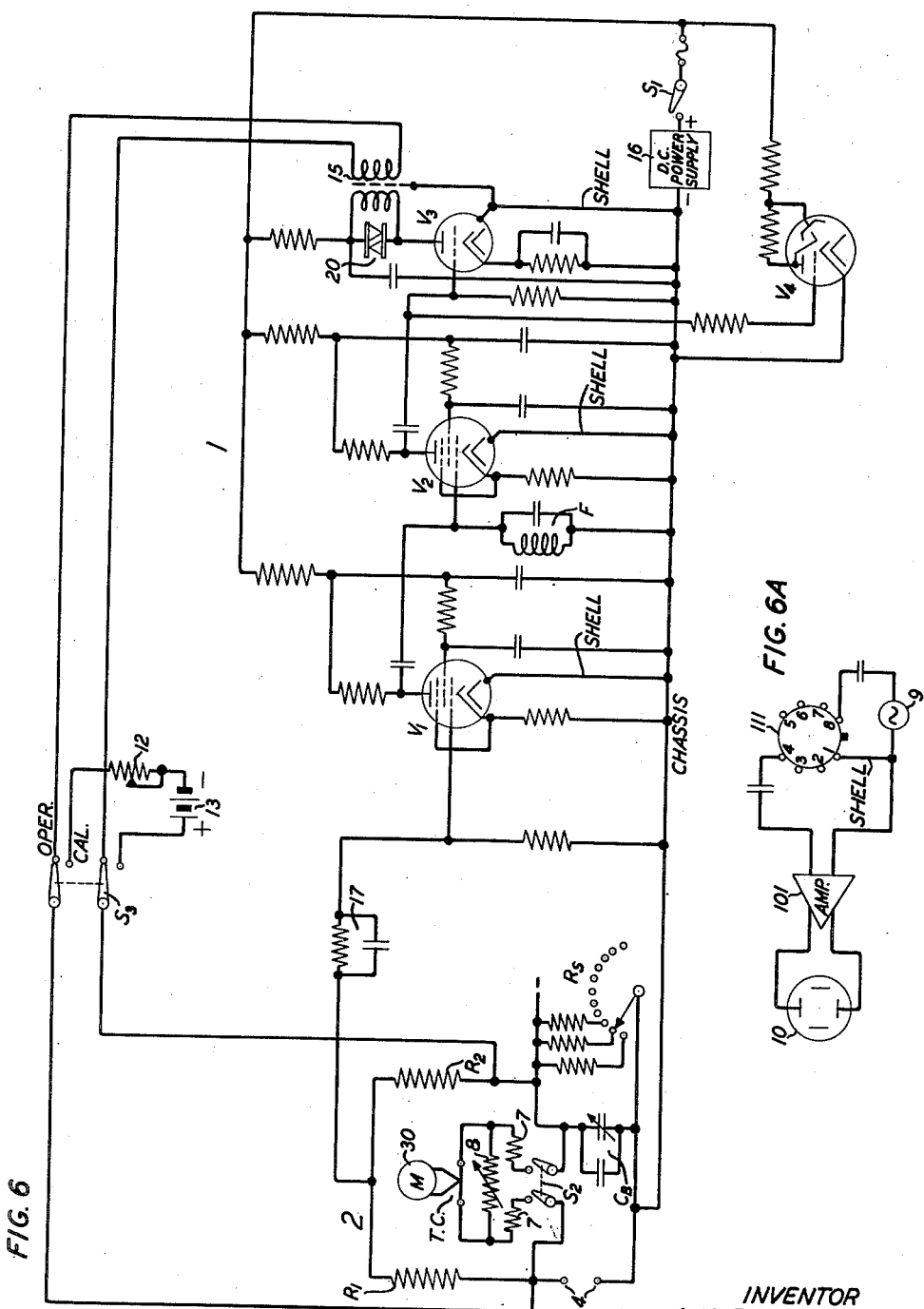
INVENTOR
A.H. DOBLMAIER
BY
Walter M. Hill
ATTORNEY Patented Mar. 30, 1954

2,673,960

UNITED STATES PATENT OFFICE 2,673,960

THERMISTOR MEASURING APPARATUS

Anton H. Doblmaier, Scotch Plains, N. J., assignor to Bell Telephone Laboratories, Incorporated, New York, N. Y., a corporation of New York Application March 22, 1950, Serial No. 151,111

9 Claims. (Cl. 324—158)

This invention relates to electrical measuring apparatus and more particularly to circuit means for determining data for the power-resistance characteristic of thermistors.

The conventional method of determining the power-resistance characteristic of thermistors is to measure the voltage across the thermistor for each of a number of different current values. The usual practice followed in obtaining each experimental point is to pass a substantially constant current through the thermistor and measure the voltage thereacross when the thermistor reaches a steady temperature condition. For many modern thermistors, which for circuit reasons must be slow in response to changes in heating or changes in surrounding temperature, this method of determining the power-resistance characteristic is very slow and cumbersome. In order to properly design circuits using these thermistors, at least 99 per cent thermal stabilization is required in order to achieve the necessary precision. Some thermistors have thermal time constants in the order of eleven minutes and in order to obtain about 99 per cent of temperature stabilization, a time interval equal to about fifty-five minutes is required. Obviously a great deal of time would be consumed in determining the power-resistance characteristic of each thermistor. If a particular design point is of interest, at least three or four such measurements are necessary in order to obtain by interpolation the exact value at the desired design point.

The problem solved by this invention was to devise a means which would govern the power flow to the thermistor or to its heater, if any, (or both) to bring the thermistor to a desired resistance in a time short compared with its thermal time constant and to maintain these values of power and resistance precisely enough for the required plus or minus 1 per cent measurement accuracy.

The object of this invention is to provide a means for rapidly determining the data for the power-resistance characteristic of thermistors which includes means for rapidly heating the thermistors and automatically controlling the heating power during the heating period.

The foregoing object is achieved by this invention which comprises in combination a bridge stabilized oscillator with terminals for connection to the thermistor to be measured and including an adjustable resistor in the bridge network for adjusting the thermistor resistance to known values. Means is also supplied for measuring the voltage across the thermistor whereby data may be obtained for plotting the power-resistance characteristic.

Figure 2:
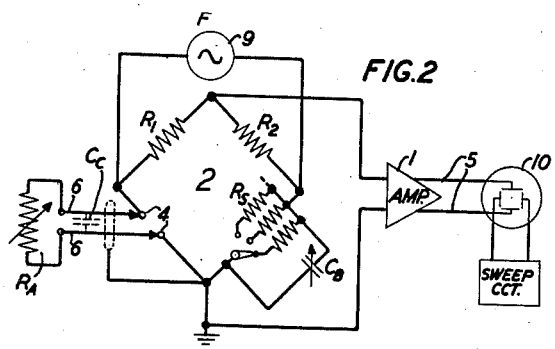
Figure 2A:
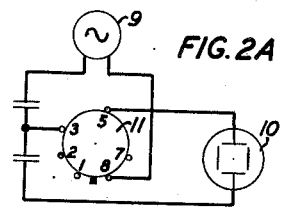
Figure 3:
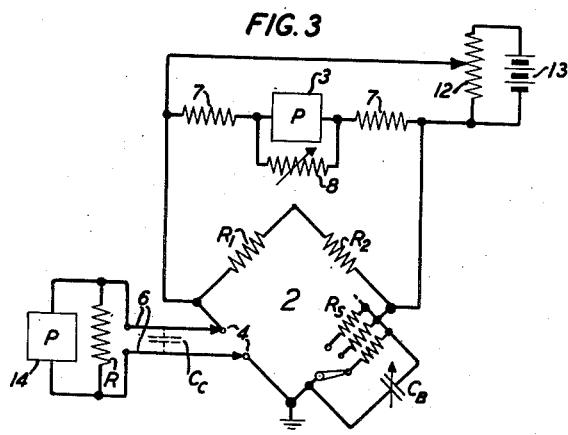
Figure 4:
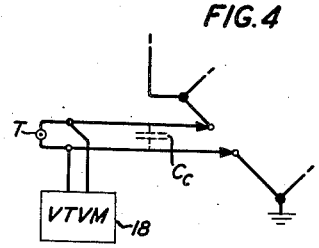
Figure 5:
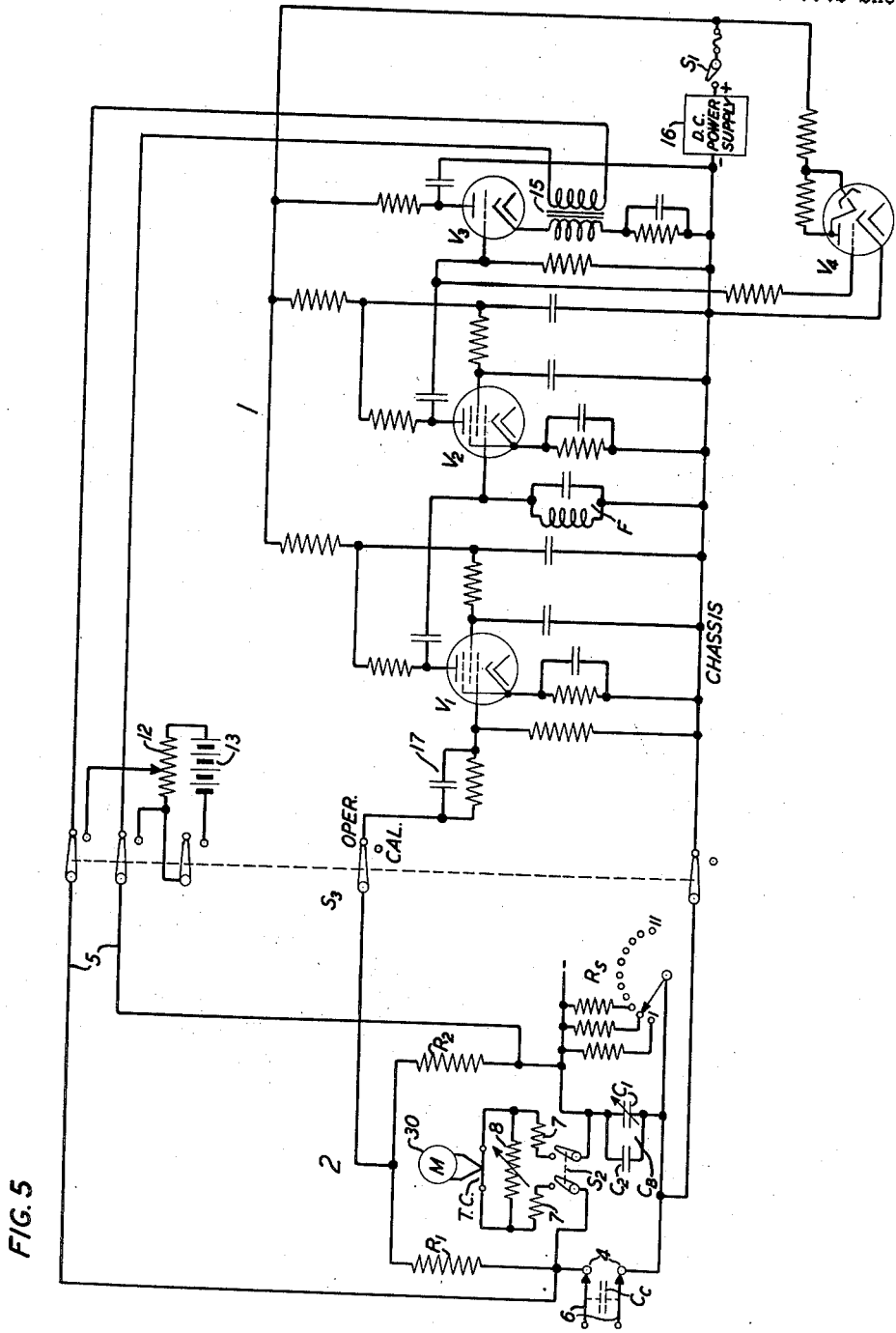

The invention may be better understood by referring to the accompanying drawings in which:

Fig. 1 shows schematically the essential elements comprising one embodiment of this invention;

Fig. 2 discloses the circuit connections for initially balancing the capacitance component of the connecting cable;

Fig. 2A schematically discloses an adapter for connection to the tube base terminals of tube $V_3$ of Fig. 5 in order to conveniently set up the circuit of Fig. 2;

Fig. 3 discloses the bridge connections for a portion of Fig. 1 set up for the purpose of calibrating the voltage indicator to correctly read the voltage across the thermistor;

Fig. 4 discloses a modification of the circuit of Fig. 1 wherein the voltage across the thermistor is directly determined by means of a high impedance meter rather than by the indirect meter connection of Fig. 1;

Fig. 5 discloses a preferred circuit arrangement for the practice of this invention;

Fig. 6 discloses another practical embodiment of the invention differing from Fig. 5 in that the output transformer is in the plate circuit, a limiter has been added and negative feedback is applied to each of the first two stages; and Fig. 6A schematically illustrates an adapter for connection to the tube base terminals of tube $V_2$ of Fig. 6 to conveniently set up a capacitance balance circuit substantially identical with Fig. 2.

Refer now more particularly to Fig. 1 where the invention embodies a bridge stabilized oscillator of substantially the same form as that shown in United States Patent 2,163,403, granted June 20, 1939, to L. A. Meacham. It differs therefrom mainly in that the frequency determining elements are located in the amplifier section rather than in the bridge network. While this is not essential to the invention, it is convenient as it simplifies the bridge network. The oscillator used to illustrate this invention comprises a tuned amplifier $I$ and a bridge network $2$. This bridge comprises preferably equal ratio arms $R_1$ and $R_2$. The other two arms comprise essentially the thermistor resistance T and a resistance $R_s$. The inherent capacitance $C_c$ of the cable connecting the thermistor T to the bridge terminal $4$ is balanced by a balancing capacitor $C_B$. In so far as this bridge network itself is concerned, it is evident that it is quite conventional and its properties are all well known. The output terminals of the bridge are connected to the input terminals of the tuned amplifier 1 and after amplification this energy is returned to the input terminals of the bridge by way of conductor 5.

For present day thermistors made of semiconductor material, the temperature coefficient is negative and consequently the resistance of the thermistor at normal ambient temperatures is considerably higher than when heated by the passage of current. In order for this oscillator to maintain oscillations, the bridge 2 must always be slightly unbalanced so that some input is supplied to the tuned amplifier 1. Consequently, at equilibrium, the resistance of the thermistor T is not quite equal to the bridge resistance Rs. However, in accordance with the teachings of the above-mentioned Meacham patent and also those of United States Patent 2,449,072, granted September 14, 1948, to E. W. Houghton, these two resistances will closely approximate each other when an amplifier of sufficiently high gain is used. Consequently, when the thermistor T is first connected to terminals 4 by way of cable 6, a large unbalance exists due to the relatively high resistance of the thermistor T as compared with the bridge resistance Rs. A large input is thus applied to the tuned amplifier 1 which in turn delivers a large output to the input terminals of the bridge 2. This rapidly heats the thermistor T. As the thermistor temperature increases, its resistance lowers, gradually approaching the resistance of resistor Rs. The bridge thus gradually approaches balance so that the voltage delivered by the amplifier to the input terminals of the bridge is lowered. A point of equilibrium is reached when the voltage input to the bridge causes the thermistor to assume a resistance which makes the loop gain unity. It will thus be observed that the bridge stabilized oscillator is a very convenient means for automatically regulating the power supplied to a thermistor to rapidly bring it to a desired resistance closely approximating the resistance of the known bridge resistor Rs. Resistance Rs may be arbitrarily chosen to give any desired thermistor resistance value.

The voltage across the thermistor T is measured indirectly by a potentiometer 3. It will be observed that this potentiometer is connected to the input terminals of the bridge through a pair of resistors 7, 7 and an adjustable shunt resistor 8. When properly calibrated by means hereinafter more fully described, this potentiometer will measure the voltage across the thermistor T.

The manner in which the circuit of Fig. 1 is initially balanced for capacity reactance and calibrated for use can be described in greater detail with reference to Figs. 2 and 3. In Fig. 2, the amplifier output terminals 5 are shown disconnected from the bridge input terminals and instead connected to the vertical deflection electrodes of a cathode-ray oscilloscope 10. This oscilloscope is being used in this case as a sensitive voltage indicator and consequently the sweep circuit acting on the horizontal electrodes may have any frequency, preferably higher than that supplied to the vertical electrodes. The thermistor T is replaced by an auxiliary resistor $R_A$, the resistance of which is made equal to any selected unit of the resistance Rs. When power is supplied to the input terminals from an oscillator 9, these resistances are brought to resistance balance and the balancing capacitor $C_B$ is adjusted to balance the inherent cable capacitance $C_c$. As this balancing procedure is conventional it requires no further description. Once this balance is achieved the balancing capacitor is left in its adjusted position and need not be changed so long as the same connecting cable 6 is employed.

Having completed the capacitance balance the bridge is now ready for calibration of its voltage indicating means. The set-up for this calibration is shown in Fig. 3. In this case the bridge is supplied with direct current from the variable source 12, 13. The voltage supplied to the bridge is measured by the potentiometer 3. A fixed resistor R is connected in place of the thermistor and the voltage drop across it is determined by another potentiometer 14. The resistance of resistor R must be so selected as to be equal to one of the desired thermistor resistance values and must be related to the corresponding bridge resistance Rs in such a way as to provide a loss through the bridge exactly equal to the over-all amplifier gain. This relationship may be determined by computation with knowledge of the gain of the amplifier and the various bridge resistances or it may be determined experimentally. The latter method is usually preferable. In either event, the method of determining it is well known in the art and requires no further discussion at this point. With the resistances related as indicated, the voltage supplied by a source 12, 13 is varied throughout a range of several volts. At several points throughout this range of variation, the voltage across resistor R is measured by potentiometer 14 and the corresponding voltage supplied to the bridge is read by potentiometer 3. This establishes a correlation between the voltage across the thermistor at balance and the indication of the potentiometer 3. Since the gain of the amplifier is substantially constant and since the ratio of the resistance Rs to the resistance of the thermistor T will remain substantially constant for all values of Rs, it is evident that this calibration will be good for all thermistor resistance values to be measured. Should the apparatus drift slightly from the calibrated readings, variable shunt resistor 8 may be adjusted to bring the readings back to those obtained on the original calibration.

Having completed the capacitance balance and having calibrated the potentiometer 3, the apparatus of Fig. 1 is ready for use. A thermistor T whose characteristic is to be determined is connected as shown in Fig. 1 and resistor Rs is adjusted to a number of different resistance values, each corresponding with the predetermined corresponding values of thermistor resistance desired. Because of the self-balancing action of the entire network, the thermistor is each time brought quickly to the required temperature in the manner previously described. At each known value to which the thermistor is thus adjusted, the voltage across the thermistor is read on potentiometer 3. Knowing the voltage across the thermistor and its resistance, the power dissipated in the thermistor is easily computed from which a point on the power-resistance characteristic can be plotted.

Where less precise measurements are acceptable, the voltage measurement may be made more rapidly with a vacuum tube voltmeter. An alternative arrangement employing such an instrument is shown in Fig. 4. The rest of the circuit is identical with Fig. 1 except that the potentiometer 3 and its associated resistors 7 and 8 need not be employed. The vacuum tube voltmeter must be of a type having a high input impedance compared with the resistance of the thermistor. When this arrangement is used it is not necessary to calibrate the voltage measuring instrument as described in connection with Fig. 3.

From the foregoing description of Figs. 1 to 4, inclusive, it is evident that a self-balancing bridge can be very conveniently employed for determining the power-resistance characteristic of a thermistor by simply adding to it a means for measuring the voltage across the thermistor and including means in the bridge network for varying the thermistor resistance to a number of known resistance values.

A preferred practical embodiment of the invention is disclosed in Fig. 5. The bridge network 2 is essentially identical with that already described for Fig. 1. The tuned amplifier 1 is shown as having three stages employing vacuum tubes $V_1$, $V_2$ and $V_3$ with a tuned network, tuned to frequency F, comprising the interstage network between the first and second stages. This determines the frequency of oscillation. The amplifier gain is derived primarily from the amplification of the first two stages. The third stage is a cathode follower providing a low impedance coupling to the bridge network through a transformer 15. Power is supplied from a direct-current power source 16 through a switch $S_1$. A cathode-ray voltage indicator tube is shown connected to the output of the second stage and comprises a vacuum tube $V_4$ which is preferably of the 6E5 type. From this brief description it will be evident that the amplifier circuits are conventional and a further detailed description of the components thereof is entirely unnecessary.

The voltage measuring network comprising series resistor 7 and shunt resistor 8 is connected to the input terminals of the bridge through a double-pole switch $S_2$. It is convenient to use such a switch in order to reduce some of the load on the amplifier during the heating period, thereby reducing the time required to bring the thermistor to the desired stable temperature. As specifically shown in this figure, the voltage measuring instrument itself is generically disclosed as a conventional direct-current galvanometer 30 connected across the shunt resistor 8 through a thermocouple conversion unit TC. The balancing capacitor $C_B$ comprises two sections in parallel, a variable section $C_1$ and a fixed section $C_2$. The resistance value of $R_S$ may be adjustable in eleven discrete steps as indicated schematically in Fig. 5.

The apparatus of Fig. 5 is adjusted for capacitance balance and calibrated in essentially the same way as previously described for Fig. 1. The capacitance balance, for example, may be accomplished by removing tube $V_3$ from its socket and replacing it with an adapter plug connected as shown in Fig. 2A. This plug 11 and the numerals adjacent the terminals thereof repersent the base connections of a 6J5 tube. If another tube type is used in place of this one, the connections should be correspondingly changed. The oscillator 9, which has a frequency equal to the pass frequency F of amplifier 1, is connected between terminals 3 and 8 which correspond with the anode and cathode terminals of tube $V_3$. This, it will be noted by referring to Fig. 5, effectively connects oscillator 9 to the primary winding of transformer 15. The cathode-ray oscilloscope 10 is connected to tube terminals 5 and 9 which correspond with the grid and cathode terminals of tube $V_3$ in Fig. 5, thus connecting the cathode-ray oscilloscope to the output circuits of the amplifier section comprising tubes $V_1$ and $V_2$ of amplifier 1. It will, therefore, be observed that the circuits set up as just described are essentially the same as those shown in Fig. 2. A suitable resistor $R_A$ shown in Fig. 2 is connected to the terminals 4 of Fig. 5 through the cable 6 which is to be used for connecting the thermistors to the bridge. The cable capacitance $C_C$ is thereby balanced against the balancing capacitor $C_B$ in the same manner as previously described for Fig. 2.

When the capacitance balance is completed, adapter 11 is removed and tube $V_3$ replaced in its socket. Switch $S_3$ is then moved to its calibrating position whereupon the circuits of Fig. 3 are set up. It will be noted that this disconnects the bridge input terminals from transformer 15 and connects them to the direct-current source 13. A potentiometer 14 and resistor R are connected through the cable 6 to terminals 4 just as previously described for Fig. 3 and by taking a plurality of simultaneous readings of voltage across resistor R and deflection of meter 30 the calibration is achieved.

If more precise readings are desired, the galvanometer 30 may be replaced by potentiometer 3 as shown in Fig. 1. The potentiometer in this case will measure the output voltage of the thermocouple.

Upon completion of the calibration, switch $S_3$ is returned to its operating position and the apparatus is ready for testing thermistors to obtain data for plotting the power-resistance characteristic.

The thermistor to be tested is connected to the cable 6 of Fig. 5 and the bridge resistance $R_S$ is selected to give the desired thermistor resistance. It is preferable that switch $S_2$ be open during the heating period so as to remove some of the load from the oscillator. This will speed the balancing process. The voltage indicator tube $V_4$ gives a visual indication of the balancing process during this period. Should the thermistor be too hot (resistance too low) the shadow angle of this tube is open with sharp edges of luminescence. If the thermistor is too cold (resistance too high) this angle is completely closed. When the thermistor has become thermally stabilized the shadow angle will be partly closed with fuzzy edges of luminescence. These three indicating conditions of the tube are obvious when it is understood that when the thermistor is too hot the feedback becomes negative and oscillation stops, thus no voltage is supplied to the grid of the indicator tube so that its shadow angle remains steadily open to produce the sharp edges of luminescence. When the thermistor is too cold the oscillator is delivering a large output voltage to rapidly heat the thermistor. This large output voltage completely closes the shadow angle of the indicator tube. When the thermistor is thermally stabilized, the output is at its lowest oscillating level so that the indicator tube will show a partly closed shadow angle with fuzzy edges of luminescence.

The bridge of Fig. 5 is schematically disclosed as having eleven resistance steps. Obviously a different number can be used if desired. In an experimental model of this apparatus, the following resistance values were used. These were employed with ratio arm resistors $R_1$ and $R_2$ each equal to 5000 ohms.

TABLE

| Step | Bridge Ohms ($R_s$) | Thermistor (T) |
|---|---|---|
| 1 | 24,860 | 25,000 |
| 2 | 19,894 | 20,000 |
| 3 | 14,924 | 15,000 |
| 4 | 11,439 | 11,500 |
| 5 | 8,800 | 8,850 |
| 6 | 5,962 | 6,000 |
| 7 | 3,970 | 4,000 |
| 8 | 2,975 | 3,000 |
| 9 | 2,476 | 2,500 |
| 10 | 1,978 | 2,000 |
| 11 | 1,477 | 1,500 |

The above tabular values are illustrative only. The bridge resistance values were obtained experimentally using a particular oscillator set-up of the type shown in Fig. 5. If an amplifier with a different gain characteristic is employed, the values of bridge resistance will be slightly different. It is preferable that resistors $R_s$ be made of wire wound units which are stable over a long period of time and which have low temperature coefficients of resistivity. All resistors should have low reactance, since thermistors have practically no reactance.

Fig. 6 discloses another practical embodiment of the invention which has been found to have the advantage of more rapid heating of the thermistor under test. In many respects this circuit is essentially the same as Fig. 5. The principal difference is that the output transformer 15 has been connected in the plate circuit rather than in the cathode circuit. This takes advantage of more gain from the third stage $V_3$. The primary of the transformer is shunted by a limiter 20 which serves to limit the output voltage during the initial heating period when the bridge 2 is considerably out of balance due to a high thermistor resistance. This limiter may be of any type but preferably comprises a silicon carbide varistor passing one milliampere at about 100 volts. The output transformer 15 should have a ratio of approximately 4 to 1. Of course these values are for illustrative purposes only and would necessarily depend upon the various parameters chosen in the design of the circuits.

Another difference will be noted when comparing Fig. 6 with Fig. 5. The cathode resistors of stages $V_1$ and $V_2$ are bypassed with condensers in Fig. 5, whereas in Fig. 6 these condensers are removed to introduce negative feedback. Other minor differences may be apparent upon a close inspection and comparison of Fig. 6 with Fig. 5. However, the most important difference is the manner in which the output transformer 15 is connected as previously mentioned.

The apparatus of Fig. 6 is initially balanced for capacity reactance in substantially the same manner as previously described in connection with Fig. 2. The particular connections, however, have been chosen in a slightly different manner for Fig. 6. These connections are shown in Fig. 6A wherein an adapter 111 is schematically disclosed in the form of a tube base. These connections correspond with those of the standard 6SJ7 vacuum tube and, except for the differences in tube types, the connections and operation are essentially identical with those previously described for Fig. 2A. In the case of Fig. 6, however, it is contemplated that vacuum tube $V_2$ be removed from its socket and replaced by the adapter 111 of Fig. 6A. The adapter 111 is connected as shown to the alternating-current source 9. The oscilloscope 10 is connected through an auxiliary high gain amplifier 101. The input circuit to this amplifier 101 should have a high impedance. Comparing Figs. 6 and 6A it will be evident that when tube $V_2$ is replaced by the adapter 111, the alternating-current source 9 will be connected between the shell and plate terminal of tube $V_2$ thereby effectively connecting this alternating-current source to the input circuit of vacuum tube $V_3$. Also, the oscilloscope 10 and its auxiliary amplifier 101 are connected directly across the tuned network F so that the oscilloscope will indicate the output voltage from bridge 2.

The connections just described will result in an arrangement substantially identical with the circuit of Fig. 2 and the bridge is brought to balance in the same manner as already described for Fig. 2.

After the capacitance balance is completed the calibration switch $S_3$ is moved to its calibrating position. This disconnects the amplifier 1 from the input terminals of bridge 2 and connects the direct-current source 13 to these terminals. The apparatus is thereafter calibrated in the same manner already described for Fig. 3. It will be noted that the amplifier input connections in Fig. 6 are not broken during the calibrating procedure as they were in Fig. 5. This is done merely to simplify the circuits. Although it is desirable to remove the input resistance of this amplifier from the bridge network, as was done by the two lower switch blades of switch $S_3$ in Fig. 5, it may be left connected to the bridge network so long as it is made very high compared to the bridge resistances.

This invention has made it possible to reduce the effective time constant of thermistors having relatively long time constants by a factor of about twenty. The data can be conveniently and quickly obtained for any exact resistance value desired without the necessity for any graphical interpolation. This is a decided advantage because the interpolation method requires a plot of at least three separate measurements, each consuming a great amount of time. The precision that can be realized when potentiometers are used for voltage measurements is comparable to that obtainable with direct-current potentiometers. These advantages make the apparatus of this invention especially useful for this purpose.

What is claimed is:

1. Apparatus for determining data for the power-resistance characteristic of a thermistor, comprising an amplifier circuit, an electric resistance bridge having four arms connected to the amplifier circuit to comprise a bridge-stabilized oscillator, means for so connecting the thermistor to be measured into an arm of said bridge that the thermistor operates to stabilize the amplitude of oscillation of said oscillator, means for determining the voltage across said thermistor, and means connected into an arm adjacent to said one arm for changing the amount of thermistor resistance required to balance said bridge.

2. Apparatus for determining data for the power-resistance characteristic of a thermistor, comprising a bridge-stabilized oscillator having a bridge comprising four arms, means for connecting the thermistor into an arm of its bridge to perform the amplitude stabilizing function, means comprising an adjustable resistance connected in an arm of said bridge adjacent to said first-named arm to change the amount of thermistor resistance required to balance said bridge whereby the resistance of said thermistor may be changed to different known amounts, and means for determining the voltage across the thermistor for each of its resistance values.

3. Apparatus for determining data for the power-resistance characteristic of a thermistor, comprising a bridge-stabilized oscillator having a bridge comprising four arms, means for connecting the thermistor into an arm of its bridge to perform the amplitude stabilizing function, means comprising an adjustable resistance connected in an arm of said bridge adjacent to said first-named arm to change the amount of thermistor resistance required to balance said bridge whereby the resistance of said thermistor may be changed to different known amounts, and a high input impedance voltmeter connected directly across the thermistor for measuring the voltage thereacross for each of its resistance values.

4. Apparatus for determining data for the power-resistance characteristic of a thermistor, comprising an amplifier circuit with input and output circuits and including means for causing said amplifier to pass only a predetermined narrow frequency band, an electric bridge of four arms, said bridge also having input and output circuits, means connecting the amplifier input circuit to the bridge output circuit, means connecting the amplifier output circuit to the bridge input circuit whereby a bridge-stabilized oscillator may be formed, means for so connecting the thermistor to be measured into an arm of the bridge as to cause said thermistor to stabilize the amplitude of the oscillator voltage, an adjustable resistor means connected into a bridge arm adjacent to said first-named arm to change the amount of thermistor resistance required to balance said bridge whereby the resistance of the thermistor may be changed to different known amounts, and means for determining the voltage across said thermistor.

5. The combination of claim 4 wherein said voltage determining means comprises a voltmeter connected to the input circuit of the bridge.

6. The combination of claim 4 wherein said voltage determining means comprises a thermocouple and potentiometer connected to the input circuit of the bridge.

7. Apparatus for determining the power-resistance characteristic of a thermistor, comprising a bridge-stabilized oscillator having a bridge comprising four arms, means for connecting the thermistor into one arm of the bridge to perform the amplitude stabilizing function, an adjustable impedance connected into an arm of the bridge adjacent to said one arm to change the amount of thermistor resistance required to balance said bridge whereby the resistance value of said thermistor may be changed to different known amounts, and means for determining the voltage across the thermistor for each of its resistance values.

8. Apparatus for determining data for the power-resistance characteristic of a thermistor, comprising a bridge-stabilized oscillator having a bridge comprising four arms, means for connecting the thermistor into one arm of the bridge to perform the amplitude stabilizing function, an adjustable impedance connected into an arm adjacent to said one arm to change the amount of thermistor resistance required to balance said bridge, and a high input impedance voltmeter connected directly across the thermistor for measuring the voltage thereacross for each of its resistance values.

9. Apparatus for determining data for the power-resistance characteristic of a thermistor, comprising a bridge-stabilized oscillator having a bridge comprising four arms, means for connecting the thermistor into one arm of the bridge to perform the amplitude stabilizing function, an adjustable impedance connected into an arm adjacent to said one arm to change the amount of thermistor resistance required to balance said bridge, and a thermocouple and potentiometer connected across the input circuit of said bridge for determining the voltage across said thermistor for each of its stabilized resistance values.

ANTON H. DOBLMAIER.

References Cited in the file of this patent

UNITED STATES PATENTS

| Number | Name | Date |
| --- | --- | --- |
| 2,375,273 | Black | May 8, 1945 |
| 2,418,842 | Kinsburg | Apr. 15, 1947 |
| 2,449,072 | Houghton | Sept. 14, 1948 |
| 2,451,858 | Mork | Oct. 19, 1948 |
| 2,565,922 | Howard | Aug. 28, 1951 |